June 30, 1970  F. S. BUONO ET AL  3,517,669
VALVED SUCTION CATHETER

Filed March 12, 1968  3 Sheets-Sheet 1

INVENTORS
FRANK S. BUONO
ROBERT A. GANDI
BY
Kane, Dalsimer, Kane, Sullivan & Smith
ATTORNEYS

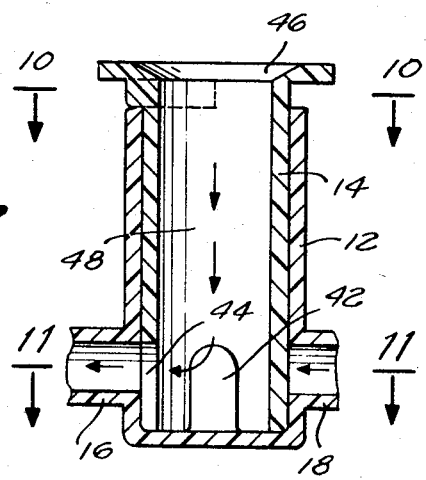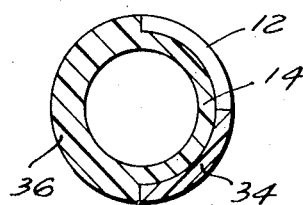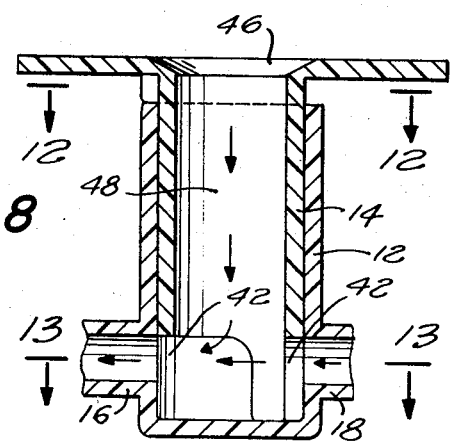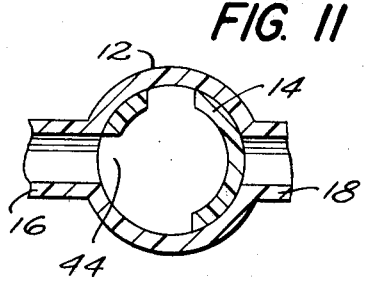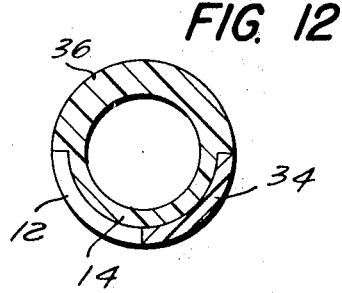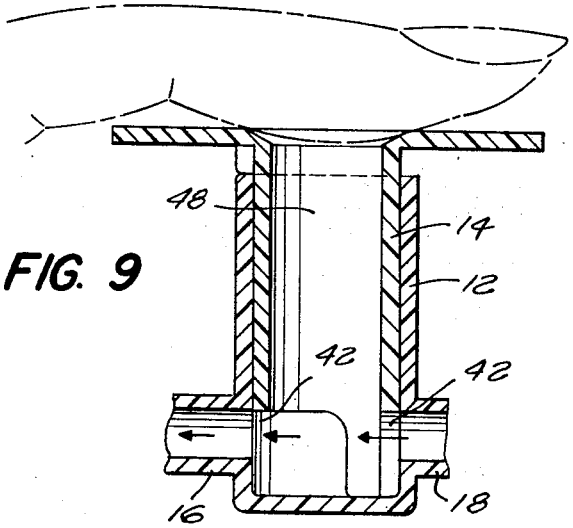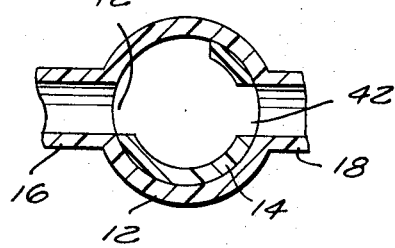

June 30, 1970  F. S. BUONO ET AL  3,517,669
VALVED SUCTION CATHETER
Filed March 12, 1968  3 Sheets-Sheet 3

INVENTORS
FRANK S. BUONO
ROBERT A. GANDI
BY
Kane, Dalsimer, Kane, Sullivan & Smith
ATTORNEYS

United States Patent Office 3,517,669
Patented June 30, 1970

3,517,669
VALVED SUCTION CATHETER
Frank S. Buono, Garfield, N.J., and Robert A. Gandi, New York, N.Y., assignors to Becton, Dickinson and Company, East Rutherford, N.J., a corporation of New Jersey
Filed Mar. 12, 1968, Ser. No. 712,459
Int. Cl. A61m 1/00
U.S. Cl. 128—276        10 Claims

ABSTRACT OF THE DISCLOSURE

A regulator-valve structure for eliminating suction forces at a catheter tip and controlling, by means of a fluid flow in an apparatus of the suction catheter type, suction surges. An elongated catheter member adapted to be connected to a source of suction by the regulator-valve structure whereby body cavities may be controllably suctioned.

BACKGROUND OF THE INVENTION

It is generally known in the prior art that suction catheters may be employed for suctioning the tracheal, bronchial, oral or nasal passages of, for example, the human body. While catheters of this type are generally known in the prior art the catheters have many disadvantages and many difficulties are encountered when using them to aspirate fluid from a body cavity. These disadvantages and difficulties are briefly discussed in U.S. Pat. No. 3,319,628, assigned to the assignee of the present invention, wherein a regulator in combination with a suction catheter apparatus is disclosed and claimed. This regulator uniquely controls the flow of aspirated fluids therethrough by controlling or regulating the flow of a second fluid therethrough. Reference may be had to the aforementioned patent for additional details with regard to the suction regulator structure.

While this suction catheter apparatus works extremely well and, for that matter, has been accepted within the industry, the present patent application constitutes and defines an improvement thereover.

Generally, in aspirating body fluids from body cavities the catheter is allowed to remain within the cavity for extended periods of time. In this regard trauma which may be induced by introduction and removal of the catheter is substantially reduced. Therefore, while the practice is to introduce the catheter in a patient's body cavity and maintain the catheter in situ for extended periods of time this practice engenders certain difficulties. If the catheter is to remain in situ for extended periods of time the catheter, connected to a constant source of suction, will continuously draw some air from the patient's lungs during intubation of the tracheal bronchial tree thereby to make breathing more difficult. While the source of suction will have the greatest effect upon the atmospheric opening in the regulator structure the source of suction also allows an unwanted partial vacuum, however slight, to occur at the distal end of the catheter. Thus, both air and fluids are sucked from the body cavity at periods of time other than when desired and the loss of air may make breathing extremely difficult.

SUMMARY OF THE INVENTION

The present invention, accordingly, seeks to overcome the disadvantages existing in present day suction catheter regulator apparatuses, namely, the elimination of cross-suctioning, the partial suctioning at the catheter distal end when the regulator atmospheric port is open. Thus, in a broad sense the invention contemplates a suction catheter regulator apparatus for use in aspirating a body cavity including conduit means to connect a source of vacuum to the cavity. The regulator comprises a body member having a plurality of ports, at least some of which are capable of being closed when the apparatus is not in use thereby to prevent suction within said cavity and a valve key received and supported by the body for relative movement. Said valve being movable to open said body ports during an aspirating operation and having a port that is adapted to be closed to varying degrees in accordance with the amount of suction desired within the cavity.

In accordance with the foregoing discussion it is a principal object of the invention to provide a suction catheter regulator apparatus of the type used in the aspiration of body fluids and including a unique valve mechanism thereby to prevent cross-suctioning of the body cavity when the regulator apparatus catheter port is closed.

Other objects and advantages of the present invention will become apparent as the following discussion of the preferred embodiments is developed.

BRIEF DESCRIPTION OF THE DRAWINGS

The accompanying drawings form a part of the present invention. By these drawings

FIG. 7 is a vertical section of the suction catheter regulator apparatus of FIG. 1 with the valve key having been rotated to close the catheter port;

FIG. 8 is a view similar to FIG. 7 with the valve key having been rotated to open the catheter port;

FIG. 9 is a view similar to FIG. 8 with the atmospheric port closed during usage of the apparatus;

FIGS. 10–13 are horizontal sectional views as seen along the lines 10—10, 11—11, 12—12 and 13—13, respectively, in FIGS. 7 and 8;

BRIEF DESCRIPTION OF THE PREFERRED EMBODIMENTS

Figure 1:
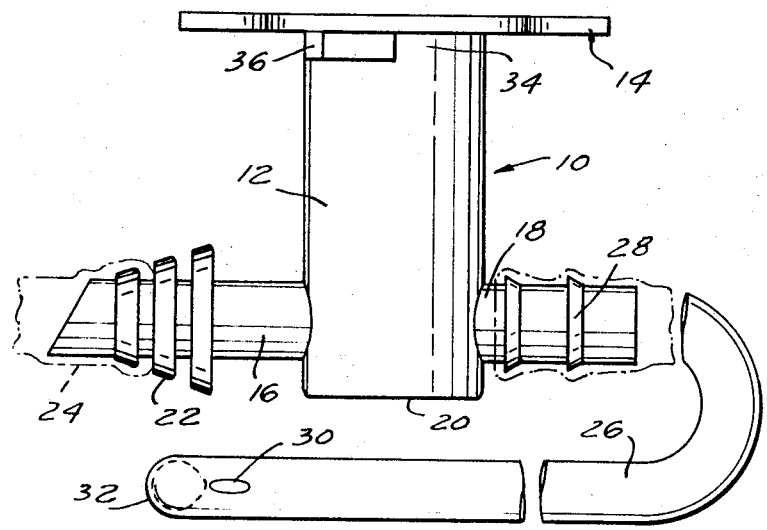
FIG. 1 illustrates in elevation one form of a suction catheter regulator apparatus.

Referring now to the drawings and in particular to FIG. 1, the suction catheter regulator apparatus is represented by the numeral 10. Generally the apparatus, in addition to necessary connecting conduits, includes an adapter body 12, a valve key 14, and a pair of body ports including a suction port 16 and a catheter port 18.

The apparatus may be formed of any suitable material, including metal and plastics, having rigid properties, for example, nylon and polystyrene, to name a fed. Also the material should be chemically inert to the fluids being collected.

Figure 2:
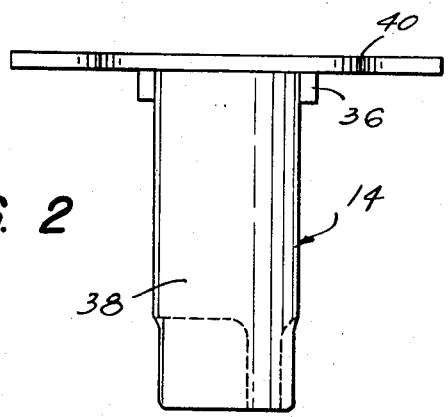
FIG. 2 illustrates in elevation a valve key used in conjunction with a catheter adapter, both forming a part of the apparatus of FIG. 1.
Figure 3:
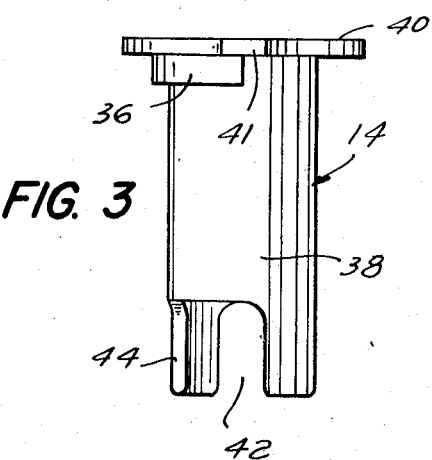
FIG. 3 is a view similar to FIG. 2 with the valve key having been rotated through an angle of 90°.
Figure 5:
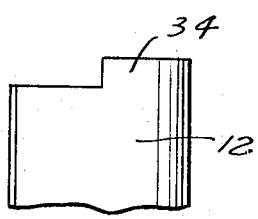
FIG. 5 is a fragmentary view in elevation of the catheter adapter.

The body 12 is cylindrical in construction having an open end and a closed end 20. As shown in FIG. 1 the valve key 14, similarly of cylindrical construction, is received for rotation within the body and by cooperating structure, on both the body and key, to be later discussed, the rotational limits of the key relative to the body and the body ports are defined. The limits are fixed and rotationally removed from each other by a suitable angle, as for example an angle of substantially 90°. Thus, the catheter port, which may be fully open to the body interior when the key is at one limit, is progressively closed by rotation of the key within the quarter turn range and is completely closed from communication with the body interior when the key has moved to the other limit extreme. These conditions are illustrated in FIGS. 2 and 3.

The suction and catheter ports 16 and 18 are provided adjacent the closed end of the body 12 and in communication with the interior thereof. As may be clearly seen in FIG. 6 the ports are located in a manner such that their axes are common to each other. The ports, further, may be formed integrally with the body during, for example, a molding process or otherwise fixedly secured to the body.

The suction port 16 is in the form of a longitudinally extending tubular conduit member provided with a series of concentric ribs or ridges 22 thereby to provide frictional and gripping engagement with tubing 24 which is operably connected to a source of vacuum (not shown). The concentric ridges are of increasing diameters so that a variety of sizes of tubing may be employed from the vacuum source. Any tubing generally used to operatively connect a catheter assembly may be employed.

The catheter port 18 is similarly formed and supported by the adapter body 12. The catheter port is adapted to receive a flexible tubular member 26 such as a suction catheter which frictionally engages the port structure 18 in a press fit. To insure an airtight connection the port may be provided with ridges 28.

The catheter tubing may be made of polyvinyl or other suitable flexible plastic material, as well as rubber, both natural and synthetic, that is not toxic to the patient or to parenteral fluids collected. For reasons that may be clear, it is convenient to use a tubing which is translucent or transparent as opposed to an opaque tubing, although the latter may be used.

As noted in FIG. 1, the distal end of the catheter tubing 26 is provided with a slotted opening 30 and a bevelled end portion 32, with an opening therein. These are, in the trade, generally referred to as a "smooth whistle-tip and eye."

Figure 6:
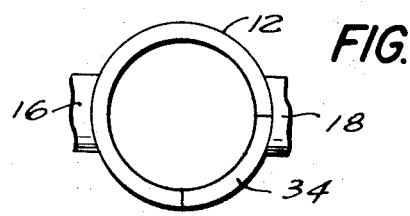
FIG. 6 is a fragmentary top plan view of the catheter adapter.

The structure for limiting the valve key rotation within substantially a quarter turn may be most clearly seen in FIGS. 2-6. Thus, the upper open of the adapter body is provided with an annular cut-out through a substantial peripheral length to define a longitudinally extending side portion 34. As seen in FIG. 6, the arcuate length of the side portion is substantially 90°. A collar 36 is provided at one end of the valve key. This collar has an arcuate length of approximately 180° and when the valve key 14 is received on the body 12 the collar both freely moves within the arcuate cut-out portion of the body 12 and forms a smooth extension of its side wall. As is apparent, rotation of the valve key relative to the adapter body is limited by the abutting interaction between the respective ends of the collar and side portion.

Figure 4:
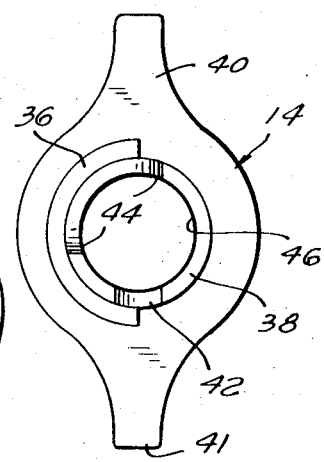
FIG. 4 is a bottom plan view of the valve key.

Referring particularly to FIGS. 2-4, the overall construction of the valve key is seen. The key includes a cylindrical body 38 which is substantially of the same length as the adapter body, a planar top handle portion 40 with diametrically opposed wings 41 and a pair of diametrically opposed openings 42 at the bottom of the valve key. For convenience the openings 42 are formed in the plane bisecting the wings 41. In this manner the valve key may be readily located thereby to provide communication between the suction source and the catheter distal end. A second opening 44 is also provided in the wall of the valve body 38. This opening as shown most clearly in FIG. 3, communicates with one of the openings 42 and extends through an arcuate distance of approximately 90°. Thus, even though the catheter port is closed the atmospheric port 46 is open to the suction source. Additionally, and of great importance, when opening the catheter port to the vacuum source the latter is always in communication with the atmospheric port so that a large surge of suction does not occur at the catheter port. In this manner negative pressure is allowed to build slowly at the catheter distal end and body tissue is not damaged.

Operation of the apparatus 10 should be apparent from the foregoing discussion and from FIGS. 7-13. The flexible tubular member 26 is placed into either the oral, nasal, tracheal or bronchial passageways of a patient from which fluid is to be aspirated. A suitable source of vacuum is operably connected to the suction port 16 by means of a line 24 connected to concentric ridges 22. Irrespective of valve key positioning the atmospheric and suction ports are in communication thereby, at all times, to satisfy vacuum needs of the apparatus. When fluid is to be aspirated from the desired cavity, a suitable container is interposed between the vacuum source and the suction port 16 and a suction is applied. Thereupon the valve key is rotated to open the catheter port (FIG. 8) and either the thumb or a finger is placed on the valve key (FIG. 9) closing the atmospheric port 46.

The atmospheric port, to aid in closing, is conveniently designed to receive a finger at the opening. Depending on the amount of suction required, partial or complete finger closure may be used, regulating the flow of air through the bore 48 of the valve key. Thus, if the atmospheric port is only partially covered or closed by a finger a partial vacuum is produced and fluid aspirated will flow through the apparatus slowly thereby causing substantially no irritation to the tissues due to suction impact. Thereafter, closure of the atmospheric port by complete coverage with the finger may be employed to increase the fluid flow from the body cavity by reducing the flow of the second fluid (air) through the apparatus.

It has been found that suction applied in this manner even when at maximum flow of fluid through the catheter apparatus, substantially minimizes irritation of the surrounding tissue thereby substantially reducing cellular debris therefrom. This operation has been discussed in U.S. Pat. No 3,319,628, issued on May 16, 1967 and assigned to the assignee of the present invention.

Further to the foregoing discussion, the valve key, either after the catheter is properly oriented in the body cavity and before fluid is aspirated or after one aspiration and before a second, is moved to the FIG. 7 position, closing the catheter port. In this regard the catheter need not be oriented and reoriented with attendant trauma but rather left in the body cavity without even the slightest vacuum being experienced at the catheter distal end. Thus, the valve assembly performs in a manner to prevent cross-suctioning or, in other words, when the atmospheric port is open there is no suction applied at the catheter distal end.

Additional forms of the invention are shown in FIGS. 14-15 and 16-17, respectively. These forms are generally similar to the apparatus already discussed both in construction and operation.

Figure 14:
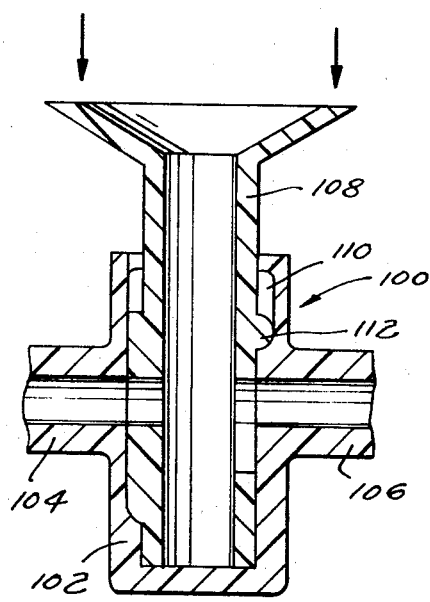
FIGS. 14 and 15 illustrate a second form of a suction catheter regulator apparatus with the valve element located in positions wherein the catheter port is open and closed, respectively.

In FIG. 14, a second embodiment of the suction catheter regulator apparatus is denoted by the numeral 100. The apparatus includes an adapter body 102 that is formed integrally with a suction port 106 and a catheter port 104 or otherwise supports the same, and a valve member 108. The body may be constructed in the manner and of the materials, as above. Thus, the body is generally cylindrical in construction and receives a complementary formed valve member for both opening and closing the catheter port 104. As is apparent the valve body is vertically movable between upper and lower limits wherein the port 104 is closed and opened, respectively. The limits are defined by the interaction of a channel 110 formed in the adapted body and a circular rib 112 carried by the valve member. By any suitable means, such as a movable friction fit, the valve is capable of being oriented in either the catheter port open (down) or closed (up) position whereat, respectively, valve port 114 is in communication with the suction port 106. The apparatus is suitably provided with indicia indicating whether the catheter port is open or closed.

A second channel 116 and vertical rib 118 are provided to prevent rotation of the valve member relative to the adapter body.

Figure 15:
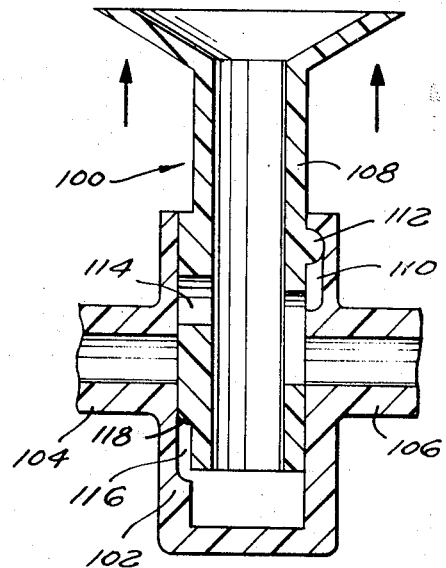
Figure 16:
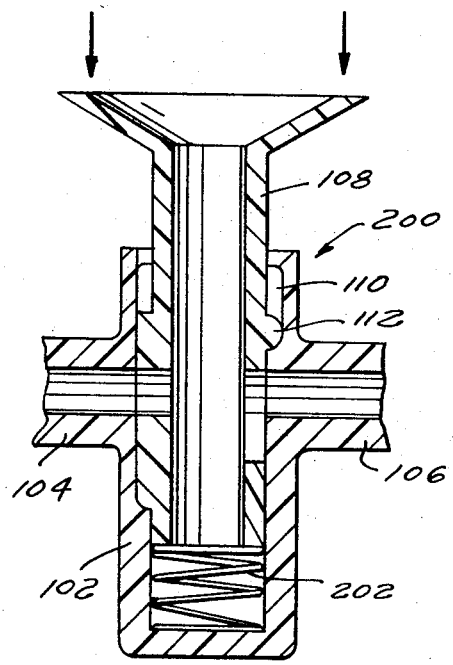
FIGS. 16 and 17 illustrate a further form of a suction catheter regulator apparatus with the valve element located as in FIGS. 14 and 15, respectively.
Figure 17:
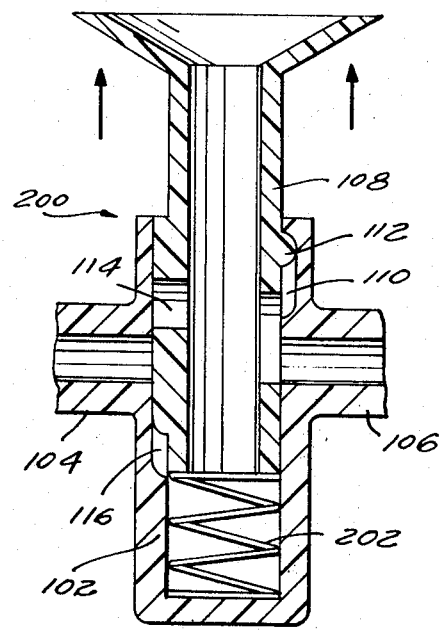

The embodiment as shown in FIGS. 16 and 17 is identical to that of FIGS. 14 and 15 except that the valve member 108 is biased by resilient means to the catheter port closed position and movable against the bias to a catheter port open position during aspiration of a body passage or cavity. In FIGS. 16 and 17 the resilient means is represented by compression spring 202. Directional arrows, in all figures, indicate the direction of movement of the valve member 108 to both open and close the catheter port.

From the foregoing it should be apparent that the objects and advantages of the invention are carried out. While the foregoing discussion is directed to certain preferred embodiments of the suction catheter regulator apparatus this has been done for the purpose of illustration only and not by way of limitation since the invention and its readily apparent modifications are to be determined by the scope of the claims appended hereto.

Having described the invention we claim:

1. A suction catheter apparatus of the type adapted for the aspiration of fluids from a body cavity under controlled operating conditions comprising a flexible elongated catheter tube having a distal end adapted to be received with said body cavity, a longitudinally elongated adapter body having an open upper end and a closed lower end, said body providing a plurality of fluid ports between said ends in communication with the body interior and carrying at said ports nipple conduits one of which removably supports said catheter tube, the other of which is adapted to be mounted to a source of suction so that material aspirated from said body cavity will be drawn away therefrom, a valve element adapted to selectively open and close said catheter port, said valve being longitudinally elongated and cross-sectionally configured to be complementary to the adapter body, said valve having a finger engaging atmospheric port at one end and a plurality of fluid ports at the other thereby to continuously maintain fluid communication between said suction source and said atmospheric port yet selectively provide for fluid communication between said suction source and the body cavity, said valve being received within said adapter body whereby relative movement of the valve between limits defined by a catheter port closed and open position provides said fluid communication between the body cavity and suction source so that regulation of air flow through the atmospheric port by varying the degree of atmospheric port closure regulates the vacuum intensity at the catheter distal end and correspondingly the withdrawn flow of aspirated fluid.

2. The suction catheter apparatus of claim 1 wherein said valve element is rotated relative to said adapter body to open and close the catheter port.

3. The suction catheter apparatus of claim 1 wherein said valve element is movable axially relative to said adapter body to open and close the catheter port.

4. The suction catheter apparatus of claim 3 further comprising means to bias the valve element to a catheter port closed position.

5. The suction catheter apparatus of claim 4 wherein said biasing means is a spring.

6. The suction catheter apparatus of claim 1 wherein said suction port nipple is formed with concentric ridges of increasing diameter so that varying sizes of tubing may be used to form a pressed fit from said vacuum source.

7. The suction catheter apparatus of claim 1 wherein said catheter tube distal end is bevelled and carries an opening adjacent thereto.

8. The suction catheter apparatus of claim 1 wherein the axes of said body ports and nipple conduits are common, and said valve element carrying at said one end and surrounding said atmospheric port a generally oval surface that major axis of which when located parallel to the common axis indicates an open catheter port.

9. The suction catheter apparatus of claim 1 comprising interacting means on said adapter body and valve element defining the limits of relative movement between ports.

10. The suction catheter apparatus of claim 9 wherein the interacting means includes a substantially semi-circular collar adjacent said valve element oval surface and an arcuate projection at the adapter body open end thereby to limit relative movement to approximately a one-quarter turn.

References Cited

UNITED STATES PATENTS

| | | | |
|---|---|---|---|
| 3,319,628 | 5/1967 | Halligan | 128—276 |
| 3,335,727 | 8/1967 | Spoto | 128—276 |

RICHARD A. GAUDET, Primary Examiner

G. E. DUNNE, Assistant Examiner

U.S. Cl. X.R.

15—421; 137—625.24